United States Patent
Gunji

(10) Patent No.: US 6,930,405 B2
(45) Date of Patent: Aug. 16, 2005

(54) VEHICLE CONTROL APPARATUS

(75) Inventor: Kenichiro Gunji, Ashigarakami-gun (JP)

(73) Assignee: Nissan Motor Co., Ltd., Kanagawa (JP)

( * ) Notice: Subject to any disclaimer, the term of this patent is extended or adjusted under 35 U.S.C. 154(b) by 142 days.

(21) Appl. No.: 10/673,199

(22) Filed: Sep. 30, 2003

(65) Prior Publication Data

US 2004/0070270 A1 Apr. 15, 2004

(30) Foreign Application Priority Data

Oct. 15, 2002 (JP) ........................................ 2002-299831

(51) Int. Cl.$^7$ .......................... B60K 40/02; B60K 1/00; B60L 11/00; B60T 8/64; B60P 9/04
(52) U.S. Cl. .......................... 290/40 C; 701/22; 477/4; 180/65.1; 180/65.4; 180/65.8; 303/152
(58) Field of Search .......................... 290/40 C; 701/69, 701/22, 41, 70; 303/152; 475/204; 477/3, 4; 180/65.1, 65, 65.3, 65.8

(56) References Cited

U.S. PATENT DOCUMENTS

| | | | |
|---|---|---|---|
| 6,549,840 B1 * | 4/2003 | Mikami et al. ................ | 701/69 |
| 6,615,940 B2 * | 9/2003 | Morisawa ................... | 180/65.1 |
| 6,741,917 B2 * | 5/2004 | Tomikawa .................... | 701/22 |
| 2002/0058564 A1 * | 5/2002 | Yamamoto et al. ............. | 477/3 |
| 2002/0094908 A1 * | 7/2002 | Urasawa et al. ............... | 477/3 |
| 2002/0107617 A1 * | 8/2002 | Tomikawa .................... | 701/22 |
| 2004/0122579 A1 * | 6/2004 | Ashizawa et al. ............. | 701/70 |
| 2004/0204803 A1 * | 10/2004 | Matsuda et al. .............. | 701/22 |

FOREIGN PATENT DOCUMENTS

JP          11-234808 A          8/1999

* cited by examiner

Primary Examiner—Darren Schuberg
Assistant Examiner—Julio C. Gonzalez
(74) Attorney, Agent, or Firm—Shinjyu Global IP Counselors, LLP

(57) ABSTRACT

A vehicle control apparatus performs regenerative braking by regeneratively operating first and second motor-generators to apply first and second braking torques in response to a deceleration request. The vehicle control apparatus is improves the efficiency in regeneratively generating electric power without greatly disturbing the balance between the. The control apparatus calculates an ideal front-rear wheel distribution ratio for front wheel braking torque and the rear wheel braking torque, and also calculates a distribution allowance for the ideal front-rear wheel distribution ratio. The control apparatus then corrects the ideal front-rear wheel distribution ratio within the distribution allowance such that the electric power generation efficiencies of the first motor-generator connected to the rear wheels and the second motor-generator connected to the front wheels are increased. Based on the corrected front-rear wheel distribution ratio, the control apparatus calculates the torque command values to be sent to the motor-generators.

10 Claims, 8 Drawing Sheets

① ··· Ideal Front-Rear Wheel Distribution Ratio

② ··· Distribution Allowance in 4WD Mode

③ ··· Distribution Allowance in 2WD Mode

VEHICLE CONTROL APPARATUS

BACKGROUND OF THE INVENTION

1. Field of the Invention

The present invention relates to a vehicle control apparatus. More particularly, the present invention relates to regeneration control of a motor-generator when a vehicle decelerates.

2. Background Information

In recent years, a significant amount of attention has focused on hybrid vehicles. Basically, hybrid vehicles are vehicles that use both an internal combustion engine and an electric motor as vehicle travel drive sources for the purposes of improving fuel efficiency and achieving cleaner exhaust. One example of a four-wheel drive hybrid vehicle is disclosed in Japanese Laid-Open Patent Publication No. 11-234808. This publication describes a technology in which an engine and an electric generator are connected to a pair of front wheels and an electric motor is connected to a pair of rear wheels. Thus, four-wheel drive can be accomplished by driving the electric motor with electric power regenerated by the electric generator. This publication further discloses a technology for controlling the distribution of the drive torque of the front wheel axles and the drive torque of the rear wheel axles in response to the traveling state of the vehicle during a four-wheel drive operation.

In view of the above, it will be apparent to those skilled in the art from this disclosure that there exists a need for an improved vehicle control apparatus. This invention addresses this need in the art as well as other needs, which will become apparent to those skilled in the art from this disclosure.

SUMMARY OF THE INVENTION

It has been discovered that the hybrid vehicle described in the aforementioned publication applies a braking torque to the wheels by operating the generator regeneratively when the vehicle is decelerated in response to a deceleration request corresponding to a depression of the brake pedal. As a result, the kinetic energy of the vehicle is recovered as generated electric power and the energy efficiency can be improved.

However, there has not been sufficient investigation regarding the distribution ratio between the regeneration torque of the rear wheels and the regeneration torque of the front wheels during vehicle deceleration.

The main object of the present invention is to obtain regenerative electric power in an efficient manner by increasing the electric power generation efficiency of the motor-generators without greatly disturbing the balance between the braking torque of the rear wheels and the braking torque of the front wheels during vehicle deceleration.

In view of the above, a vehicle control apparatus of the present invention is provided that comprises a first motor-generator, a second motor-generator, and a regenerative braking component. The first motor-generator is operatively coupled to at least one first wheel. The second motor-generator is operatively coupled to at least one second wheel that is not connected to the first motor-generator. The regenerative braking component is configured to perform regenerative braking in which a first braking torque is applied to the first wheel by regeneratively operating the first motor-generator while a second braking torque is applied to the second wheel by regeneratively operating the second motor-generator. The regenerative braking component is configured to include an ideal front-rear wheel distribution ratio calculating section, a distribution allowance calculating section, and a distribution ratio correcting section. The ideal front-rear wheel distribution ratio calculating section is configured to calculate an ideal front-rear wheel distribution ratio between the first braking torque applied to the first wheel and the second braking torque applied to the second wheel. The distribution allowance calculating section is configured to calculate a distribution allowance of the ideal front-rear wheel distribution ratio. The distribution ratio correcting section is configured to correct the ideal front-rear wheel distribution ratio within a range of the distribution allowance to increase electric power generation efficiency of at least one of the first and second motor-generators.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
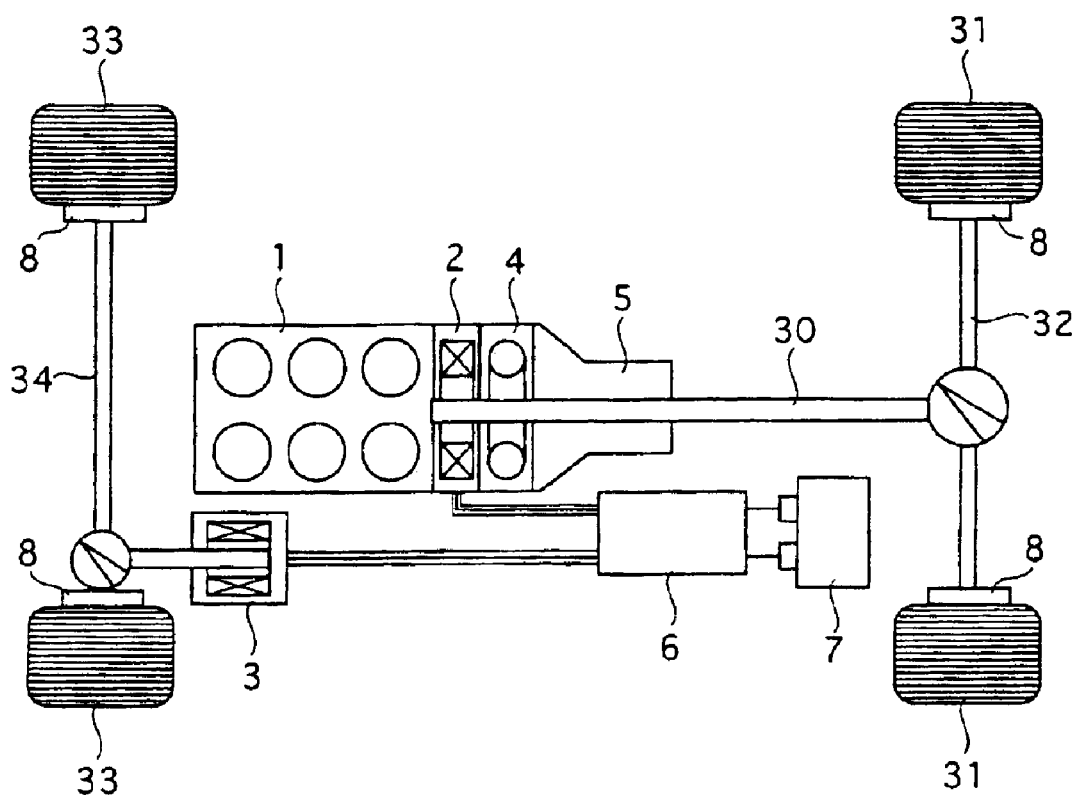
FIG. 1 is a schematic system configuration diagram of a vehicle equipped with a vehicle control apparatus in accordance with a first embodiment of the present invention.

Referring initially to FIG. 1, a hybrid vehicle is illustrated as a system configuration diagram that is equipped with a control apparatus in accordance with a first embodiment of the present invention. This hybrid vehicle includes an internal combustion engine 1, a first motor-generator 2, and a second motor-generator 3 as three vehicle travel drive sources. As explained below, the control apparatus of the present invention is configured and arranged to obtain regenerative electric power in an efficient manner during vehicle deceleration by improving the electric power generation efficiency of the motor-generators 2 and 3 without greatly disturbing the balance between the braking torques of the rear wheels 31 and the braking torque of the front wheels 33.

The engine 1 and the first motor-generator 2 are connected directly and coaxially so as to rotate synchronously in an integral manner. The engine 1 and first motor-generator 2 are connected to the pair of rear wheels 31, which serve as the main drive wheels, and rotate the rear wheel axle 32, which is arranged transversely between the rear wheels 31. A gear changing mechanism including a conventional torque converter 4 and a conventional transmission 5 are disposed between the rear axle 32 and the engine 1 and the first motor-generator 2. The second motor-generator 3 is connected to the pair of front wheels 33 and rotates the front wheel axle 34, which is arranged transversely between the front wheels 33. Thus, the front wheels 33 are not connected to the engine 1 and are only selectively driven by the second motor-generator 3.

The first motor-generator 2 and the second motor-generator 3 are both preferably three-phase AC motor-generators that are connected electrically to a battery 7 through an inverter 6. The motor-generators 2 and 3 function both as electric motors that operate by consuming electric power from the battery 7 and as electric generators that supply electric power to the battery 7 by operating regeneratively so as to generate electricity. In other words, the motor-generators 2 and 3 can drive the wheels 31 and 33 by functioning as a motor running off electric power from the battery 7 or they can store electricity in the battery 7 by functioning as a generator running off road-surface drive torque from the wheels 10. Each of the wheels 31 and 32 is provided with a disc brake or other known hydraulic brake actuator 8. The brake actuator 8 includes a braking control system (e.g., a known anti-lock brake system (ABS)) that can adjust the brake torque independently of the depression force applied to the brake pedal 9a. Thus, thee vehicle braking system is a hydraulic-regenerative cooperative brake control system that efficiently recovers regenerative energy by executing control to reduce the brake fluid pressure of the hydraulic brake actuator 8s when it is controlling the regenerative braking torque by way of an AC synchronous motor.

However, the vehicle is not limited to these constituent features. For example, it is possible to omit the torque converter 4 and the transmission 5. It is also acceptable to connect the engine 1 and the first motor-generator 2 together with a belt, chain, or other power transmission mechanism. Furthermore, it is also acceptable to connect the engine to the front wheels 33.

Figure 2:
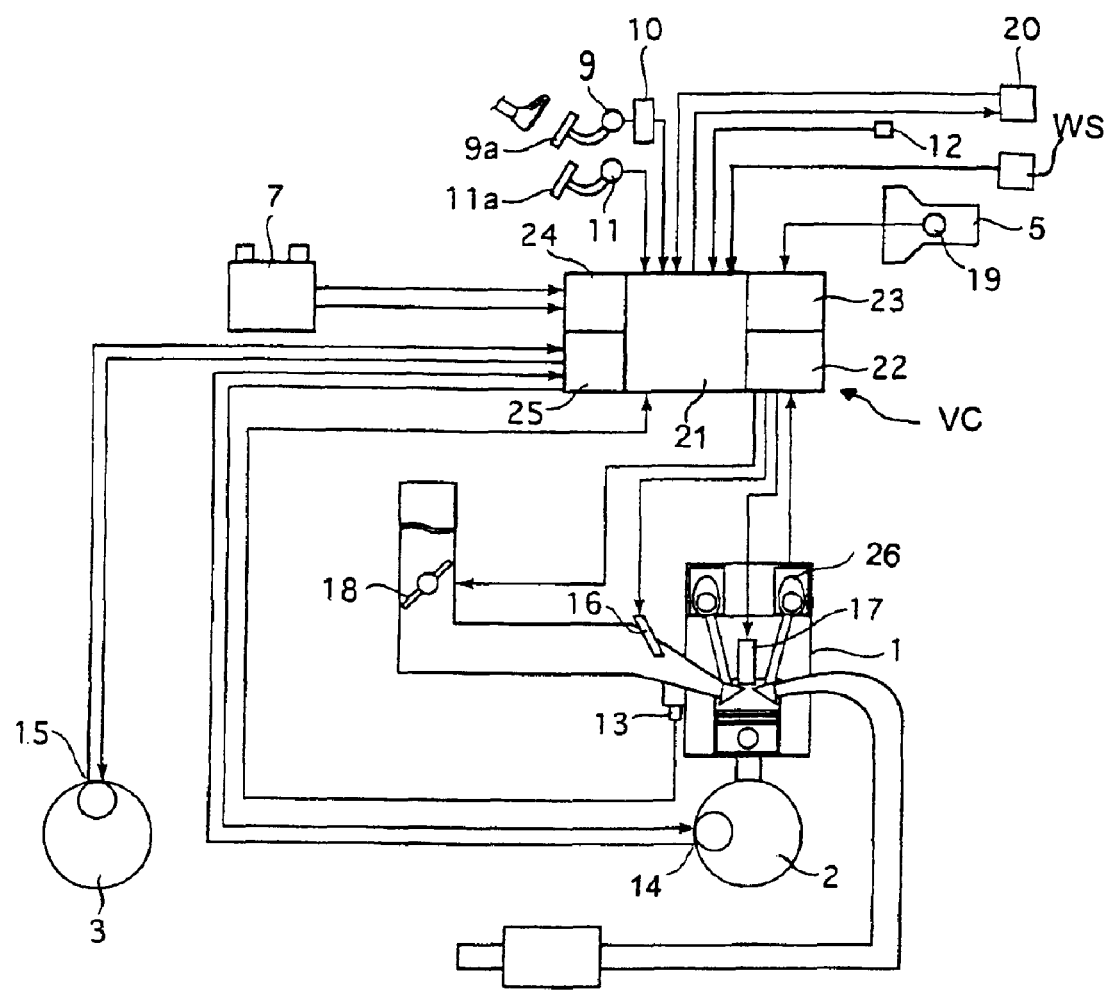
FIG. 2 is a schematic system configuration diagram of the vehicle control apparatus in accordance with the first embodiment of the present invention.

FIG. 2 is a schematic view of a control apparatus in accordance with this embodiment. The control apparatus is provided with the various sensors and switches that serve to detect and acquire vehicle operating conditions, requests of the driver (or other passenger), etc. A brake sensor 9 is configured and arranged to detect the depression force exerted by the driver against the brake pedal 9a and produce a signal indicative of the depression force or depression amount. A master cylinder pressure sensor 10 is configured and arranged to detect the pressure of the master cylinder fluid of the hydraulic brake actuator 8 and produce a signal indicative of the pressure of the master cylinder fluid of the hydraulic brake actuator 8. An accelerator sensor 11 is configured and arranged to detect the depression force exerted by the driver against the accelerator pedal 11a and produce a signal indicative of the depression force or depression amount exerted by the driver against the accelerator pedal 11a. A drive mode selection switch 12 is configured and arranged to set either a two-wheel drive mode or a four-wheel drive mode and produce a signal indicative of the current or selected drive mode. A coolant temperature sensor 13 is configured and arranged to detect the temperature of the coolant of the engine 1 and produce a signal indicative of the temperature of the coolant of the engine 1. An engine rotational speed sensor 14 is configured and arranged to detect the rotational speed of the engine 1 and the first motor-generator 2 and produce a signal indicative of the rotational speed of the engine 1 and the first motor-generator 2. A motor rotational speed sensor 15 is configured and arranged to detect the rotational speed of the second motor-generator 3, which corresponds to the rotational speed of the front wheel axle 34, and produce a signal indicative of the rotational speed of the second motor-generator 3. A transmission fluid pressure/temperature sensor 19 is configured and arranged to detect the pressure and temperature of the transmission fluid in the transmission 5 and produce a signal indicative of the pressure and temperature of the transmission fluid in the transmission 5.

The vehicle control apparatus is provided with a controller VC that stores and executes various control operations. The controller VC preferably includes a microcomputer with a various control program that controls the operation of the vehicle to carryout the present invention as discussed below. The controller VC also preferably includes other conventional components such as an input interface circuit, an output interface circuit, and storage devices such as a ROM (Read Only Memory) device and a RAM (Random Access Memory) device. The microcomputer of the controller VC includes various control units that are programmed to control the engine 1, the first motor-generator 2 and the second motor-generator 3 as well as other component to carryout the present invention as discussed below. It will be apparent to those skilled in the art from this disclosure that the precise structure and algorithms for the controller VC can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The vehicle controller VC includes the following control units: a hybrid control unit 21, an engine control unit 22, a transmission control unit 23, a battery control unit 24, and a motor control unit 25. The hybrid control unit 21 controls the vehicle in an overall manner. The engine control unit 22 performs such engine controls as controlling the fuel injection amount and fuel injection timing of the fuel injectors 16, controlling the ignition timing of the spark plugs 17 and controlling the valve timing of a variable valve timing mechanism (VTC) 26. The transmission control unit 23 controls gear changing or shifting of the transmission 5. The battery control unit 24 detects the voltage value and current value of the battery 7 and computes such quantities as the amount of stored charge or state of charge (SOC). The motor control unit 25 controls the first motor-generator 2 and the second motor-generator 3 as electric motors for supplying a drive torque or as generators for producing electrical energy that is stored in the battery 7.

The hybrid control unit 21 receives various signals from the sensors and switches and performs various tasks. The hybrid control unit 21 performs the task of computing the requested drive torque and the requested braking torque of the vehicle. The hybrid control unit 21 is operatively coupled to a brake hydraulic pressure unit 20 for controlling the hydraulic pressure to the brake actuators 8 for adjusting and controlling the braking forces applied to the wheels 31 and 33. The hybrid control unit 21 also performs the tasks of determining if automatic stopping of the engine 1 will be prohibited or allowed, and managing the generation and discharge of electricity. However, this control system in which concentrated control is performed by the hybrid control unit 21 is merely an example. It is also possible to omit the hybrid control unit 21 and configure a system in which the functions of the hybrid control unit are distributed among the other control units 22 to 25.

Figure 3:
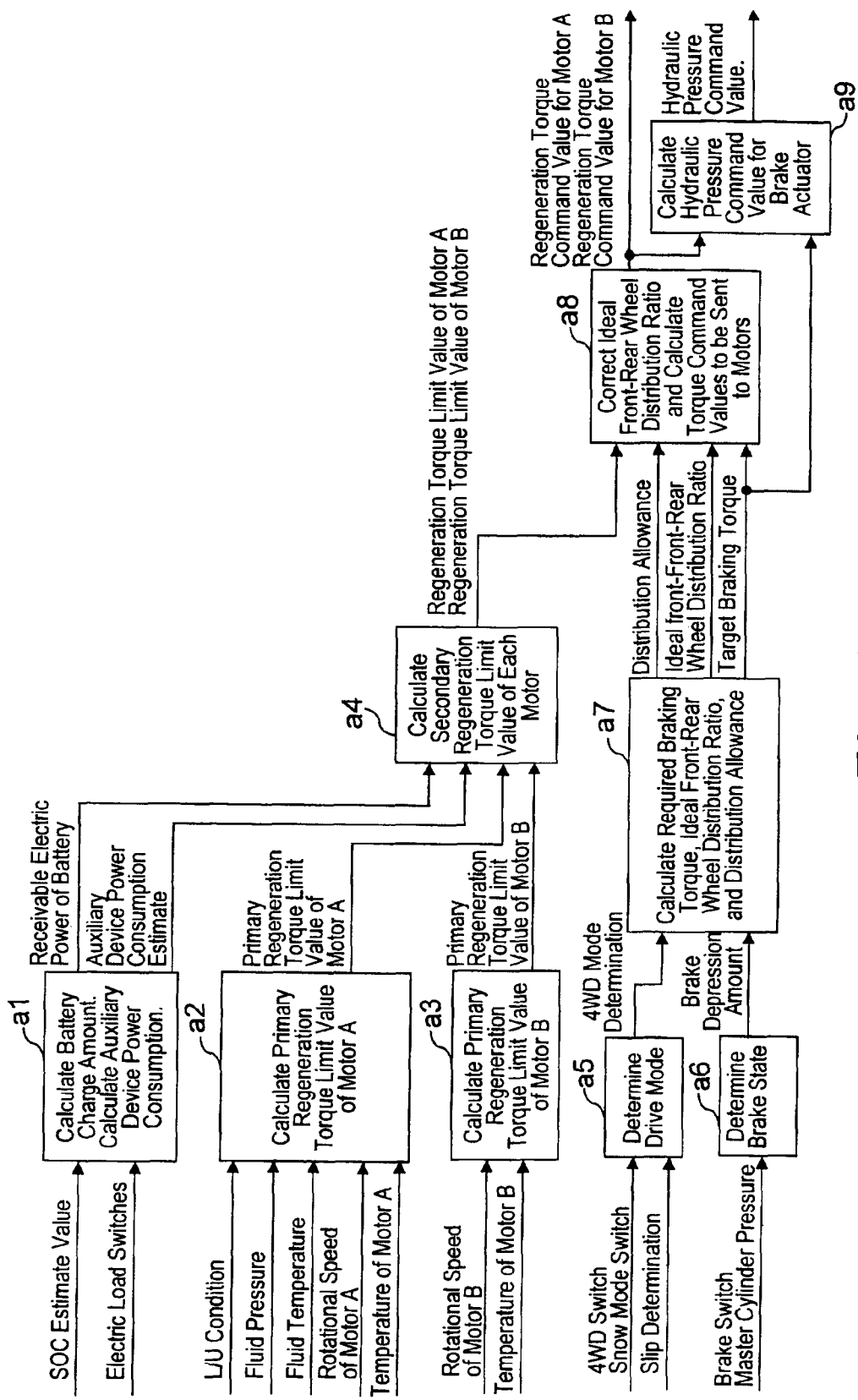
FIG. 3 is a block diagram showing the control operations executed by the control apparatus during regenerative braking in an abbreviated manner in accordance with the first embodiment of the present invention.

When the brake pedal 9a is depressed or some other deceleration request is issued, the control apparatus can apply a braking torque to the rear wheels 31 by regeneratively operating the first motor-generator 2 and/or the rear brake actuators 8, while also applying a braking torque to the front wheels 33 by regeneratively operating the second motor-generator 3 and/or the front brake actuator 8. These operations form a regenerative braking section of the vehicle control apparatus of the present invention. As seen in FIG. 3, the blocks a1 to a8 show the control operations executed during regenerative braking in an abbreviated manner. In FIG. 3, the first motor-generator 2 is indicated as "Motor A" and the second motor-generator 3 is indicated as "Motor B."

In block or step a1, the control apparatus executes the control operations of calculating the battery charge amount and the auxiliary device electric power consumption. Based on the SOC (State of Charge) or amount of stored charge estimated by the battery control unit 24, the control apparatus calculates the amount of electric power that can be received by the battery 7. This receivable electric power amount corresponds to the electric power value that can be continuously delivered to the battery 7 for a prescribed amount of time (e.g., five seconds) and has a high correlation to the SOC.

The system estimates the total electric power being consumed by auxiliary devices (electric power steering, pumps, lights, etc.) by detecting the ON/OFF status of electric load switches (not shown in the drawings), such as light switches and air conditioner switches, etc. For example, the auxiliary device electric power consumption can be estimated by estimating the electric power consumed by the actuators of the auxiliary devices in advance and adding up the pre-estimated electric power consumption amounts of the electric load switches that are ON.

In block or step a2, the control apparatus executes the control operations of calculating a primary regeneration torque limit value of the first motor-generator 2. The primary regeneration torque limit value of the first motor-generator 2 is the maximum value of regeneration torque that can be produced by the first motor-generator 2 in view of restrictions imposed by the rating of the first motor-generator 2 itself and restrictions imposed by the torque converter 4 and the transmission 5 of the power transmission system.

The primary regeneration torque limit value can be calculated, for example, as follows.

Figure 4:
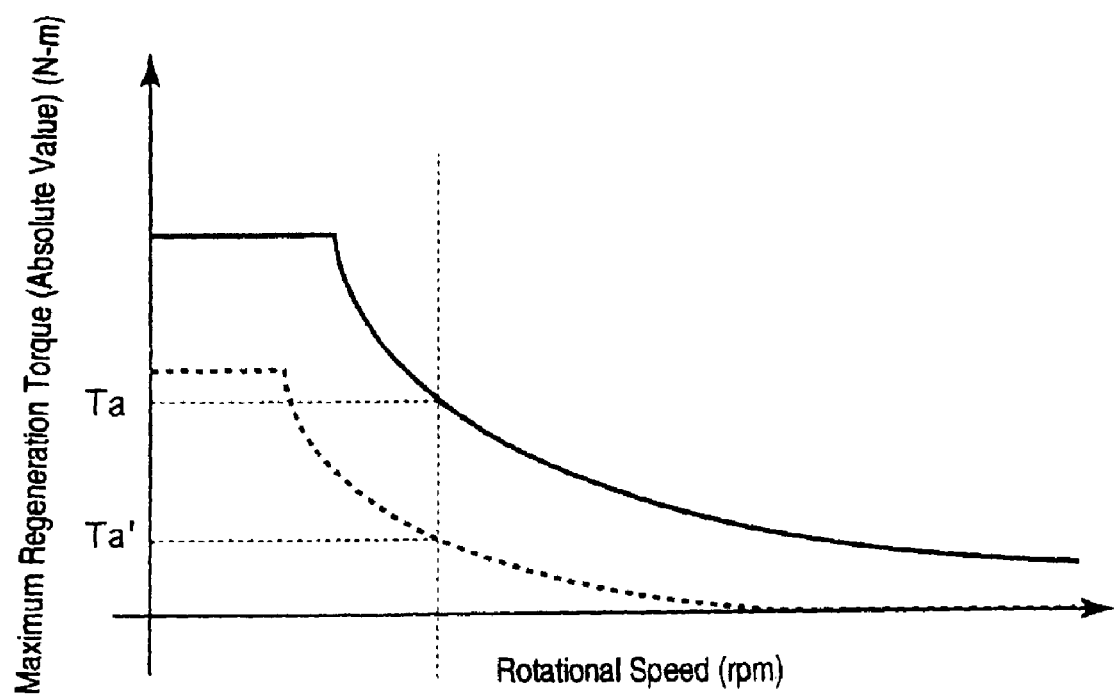
FIG. 4 is a graph showing the relationship between the rotational speed and the maximum regeneration torque of a motor-generator operated in accordance with the first embodiment of the present invention.

Referring first to FIG. 4, the relationship between the maximum regeneration torque Ta and the rotational speed of the first motor-generator 2 in illustrated, which forms a part of a first procedure (1) that is used in calculating the primary regeneration torque limit value. The rotational speed of the first motor-generator 2 can be detected with the engine rotational speed sensor 14. By referring to a map or table like that shown in FIG. 4, the maximum regeneration torque Ta that can be produced at that point in time can be calculated. It is even more preferable to detect or estimate the temperature of the first motor-generator 2 and correct the maximum regeneration torque Ta based on that temperature. For example, when the first motor-generator 2 is at a high temperature, the maximum regeneration torque Ta is limited to a prescribed value Ta' in order to curb increases in the temperature of the first motor-generator 2.

Next, in a vehicle provided with a torque converter and a transmission in the power transmission system such as the vehicle shown in FIG. 1, it is necessary to take into consideration the allowable input torque of the torque converter 4 and the transmission 5. It is preferable to adjust the allowable input torque of the transmission 5 based on the temperature and the pressure of the transmission fluid in the transmission 5 as detected by the fluid temperature sensor 19 and calculate the maximum regeneration torque of the first motor-generator 2 based on the adjusted allowable input torque of the torque converter 4 and the transmission 5. These steps form a part of a second procedure (2) that is used in calculating the primary regeneration torque limit value.

In order to apply a braking torque to the rear wheels 31 by operating the first motor-generator 2 regeneratively, it is necessary for the lockup clutch of the torque converter 4 to be engaged. In other words, if the lockup clutch of the torque converter 4 is in the released state, the regeneration torque produced by the regenerative operation of the first motor-generator 2 will not be used effectively to brake the rear wheels 31 and, consequently, it will be necessary to apply brake torque using the brake actuator 8 to decelerate the vehicle.

Finally, the smaller of the maximum regeneration torque calculated using the first procedure (1) and the maximum regeneration torque calculated using the second procedure (2) is selected as the primary regeneration torque limit value of the first motor-generator 2.

In block or step a3, the control apparatus executes the control operations of calculating primary regeneration torque limit value of second motor-generator 3. The primary regeneration torque limit value of the second motor-generator 3 can be calculated by applying the computations and control processing of the first procedure (1) to the second motor-generator 3.

In block or step a4, the control apparatus executes the control operations of calculating the secondary regeneration torque limit value of each motor-generator 2 and 3. The total regeneration electric power that can be generated by the motor-generators 2 and 3 is calculated based on the receivable electric power of the battery 7 and the estimated auxiliary device electric power consumption calculated in step a1. Based on the calculated electric power value, the secondary regenerative torque limit value of each of the motor-generators 2 and 3 is calculated under the assumption that only the motor-generators 2 and 3 are used to generate electric power (i.e., brake torque is not applied). For these calculations, it is necessary to take into consideration the efficiencies of the motor-generators 2 and 3. Finally, the smaller of the primary regeneration torque limit value of the first motor-generator 2 calculated in step a2 and the secondary regeneration torque limit value of the first motor-generator 2 is selected as the regeneration torque limit value of the first motor-generator 2 and the smaller of the primary regeneration torque limit value of the second motor-generator 3 calculated in step a3 and the secondary regeneration torque limit value of the second motor-generator 3 is selected as the regeneration torque limit value of the second motor-generator 3.

In block or step a5, the control apparatus executes the control operations of determining the drive mode of the vehicle. This vehicle is configured such that it can be operated selectively in either a two-wheel drive (2WD) mode in which only the rear wheels 31 are driven by the engine 1 and/or the first motor-generator 2, or a four-wheel drive (4WD) mode in which the rear wheels 31 are driven by the engine 1 and/or the first motor-generator 2 and the front wheels 33 are driven by the second motor-generator 3. The control apparatus determines if the vehicle is in the 4WD mode or the 2WD mode based on the status of the drive mode selection switch 12 (such as a four-wheel drive selection switch or a snow mode switch) or based on the slippage state of the wheels. For example, if the drive mode selection switch 12 is set to the 4WD mode, the control apparatus determines that the vehicle is in the 4WD mode. Meanwhile, if the wheels are determined to be slipping based on the wheel speeds detected by the wheel speed sensors WS, the vehicle is automatically set to the 4WD mode. These operations form a drive mode detecting section of the vehicle control apparatus of the present invention. The control apparatus also determines the vehicle speed based on the signals from the wheel speed sensors WS. These operations form a vehicle speed detecting section of the control apparatus.

In block or step a6, the control apparatus executes the control operations of determining the brake state of the vehicle. The control apparatus calculates the depression amount of the brake pedal 9a, which corresponds to a deceleration request, based on the detection signals from the brake sensor 9 and the master cylinder pressure sensor 10.

In block or step a7, the control apparatus executes the control operations of calculating a required braking torque, an ideal front-rear wheel distribution ratio, and a distribution allowance. The control apparatus calculates the required braking torque of the entire vehicle based on the brake depression amount obtained in step a6. These operations of steps a6 and a7 form a braking torque calculating section. The required braking torque is equivalent to the sum of the braking torques of the four wheels. Based on the required braking torque, the vehicle speed, and the slippage state, the control apparatus calculates the ideal front-rear wheel distribution ratio, i.e., the ideal ratio between the braking torque of the rear wheels 31 and the braking torque of the front wheels 33 (ideal front-rear wheel distribution ratio calculating section).

Figure 5:
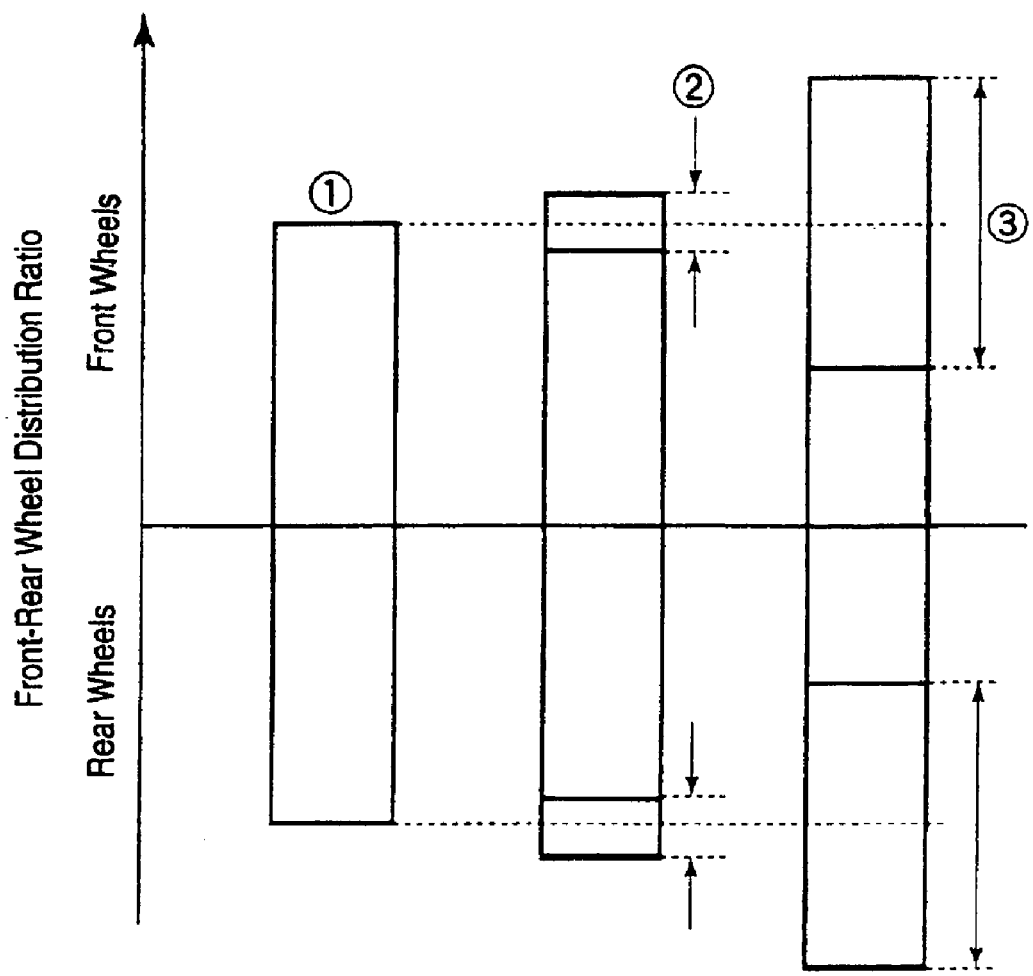
FIG. 5 is a diagrammatic view illustrating the difference in the distribution allowance between the 2WD mode and the 4WD mode in accordance with the first embodiment of the present invention.

Since the ideal front-rear wheel distribution ratio changes dynamically depending on the vehicle deceleration rate, it is also acceptable to detect or calculate the vehicle deceleration rate and calculate the ideal front-rear wheel distribution ratio based on the vehicle deceleration rate. The control apparatus also calculates the distribution allowance corresponding to the calculated ideal front-rear distribution ratio (distribution allowance calculating section). As shown in FIG. 5, the distribution allowance is set to a different value (i.e, size or range) depending on whether the drive mode is determined to be the 2WD mode or the 4WD mode in step a5. It is preferable for the distribution allowance to be relatively large in the 2WD mode and relatively small in the 4WD mode, which requires more stability. It is also acceptable to set the distribution allowance to zero in the 4WD mode. In the example shown in FIG. 5, the ideal distribution ratio between the front and rear wheels is 50:50, the distribution ratio is set to a value in a range between 40:60 and 60:40 when in the 4WD mode, and the distribution ratio is set to a value in a range between 20:80 and 80:20 when in the 2WD mode.

In block or step a8, the control apparatus executes the control operations of correcting the ideal front-rear wheel distribution ratio and calculating the regeneration torque command values to be sent to the motor-generators 2 and 3. The control apparatus finds the final front-rear wheel distribution ratio by correcting the ideal front-rear wheel distribution ratio calculated in step a7 within the ranges of the distribution allowance calculated in step a7, and the respective regeneration torque limit values of the motor-generators 2 and 3 calculated in step a4 in such a manner as to increase the electric power generation efficiency of the first motor-generator 2 and/or the second motor-generator 3 and maximize the overall electric power generation efficiency of the first motor-generator 2 and the second motor-generator 3 together (distribution correcting section). In other words, the ideal front-rear wheel distribution ratio is corrected so as to maximize the combined total generated electric power generated by the first motor-generator 2 and the second motor-generator 3.

When the brake actuators 8 do not apply brake torques to the wheels 31 and 33, the final front-rear wheel distribution ratio just described is a distribution ratio such that regeneration torque of the first motor-generator 2 and the regeneration torque of the second motor-generator 3 are substantially the same. Based on the final front-rear wheel distribution ratio and the required braking torque, the control apparatus calculates the torque command values to be sent to the motor-generators 2 and 3 and sends them to the motor control unit 25. As a result, the first motor-generator 2 is operated regeneratively so as to apply a first prescribed braking torque to the rear wheels 31 and the second motor-generator 3 is operated regeneratively so as to apply a second prescribed braking torque to the front wheels 33.

The electric power generated by operating the motor-generators 2 and 3 regeneratively can be calculated as shown by Equation 1 below, when the vehicle speed V (km/h) and the required total braking force F (N) corresponding to the required braking torques are known (this equation is only valid when the lockup clutch is engaged).

$$V \div K \cdot F \cdot (D \cdot \eta a + (1-D) \cdot \eta b) \qquad (1)$$

In Equation 1, the term D is the distribution ratio of the rear wheels 31 and the term K is a conversion coefficient with a fixed value, such as 3.6. Also the term $\eta a$ in Equation 1 is the efficiency of the first motor-generator 2, while the term $\eta b$ in Equation 1 is the efficiency of the second motor-generator 3. The terms $\eta a$ and $\eta b$ are dependent on the rotational speeds and torques of the motor-generators 2 and 3 and are determined definitively as single values when the vehicle speed, the required braking torques, and front-rear wheel distribution are known. The electric power generated by regeneration is maximized by optimizing the distribution ratio D (front-rear wheel distribution ratio). In other words, the ideal front-rear wheel distribution ratio can be corrected based on the vehicle speed and the required braking torque in such a manner that the electric power generation efficiency is maximized. The braking torque allotted to each of the motor-generators 2 and 3 must not exceed the respective regeneration torque limit value calculated in step a4 and the front-rear wheel distribution ratio must be within the distribution allowance calculated in step a7. In actual practice, a feasible method is to prepare a preset map in advance that has the vehicle speed and the braking force on the respective axes, and serves as a map of the optimum distribution ratio D. Then, the distribution ratio D can be determined for each situation and the final braking torque can be determined based on the various limitations.

When the front-rear wheel distribution ratio is calculated by correcting the ideal front-rear wheel distribution ratio as described previously, as shown in FIGS. 6 and 7, the electric power generation efficiency of the first motor-generator 2 increases from 60% to 80% when the regeneration torque of the first motor-generator 2 is decreased from Ta to Ta' and the electric power generation efficiency of the second motor-generator 3 increases from 70% to 90% when the regeneration torque of the second motor-generator 3 is increased from Tb to Tb'. In short, the electric power generation efficiencies of both motor-generators 2 and 3 can be improved and electric power can be generated with good efficiency. Since the amount by which the front-rear wheel distribution ratio can be corrected is limited by the distribution allowance, the balance between the braking torque of the front wheels 33 and the braking torque of the rear wheels 31 is not greatly disturbed.

Figure 6A:
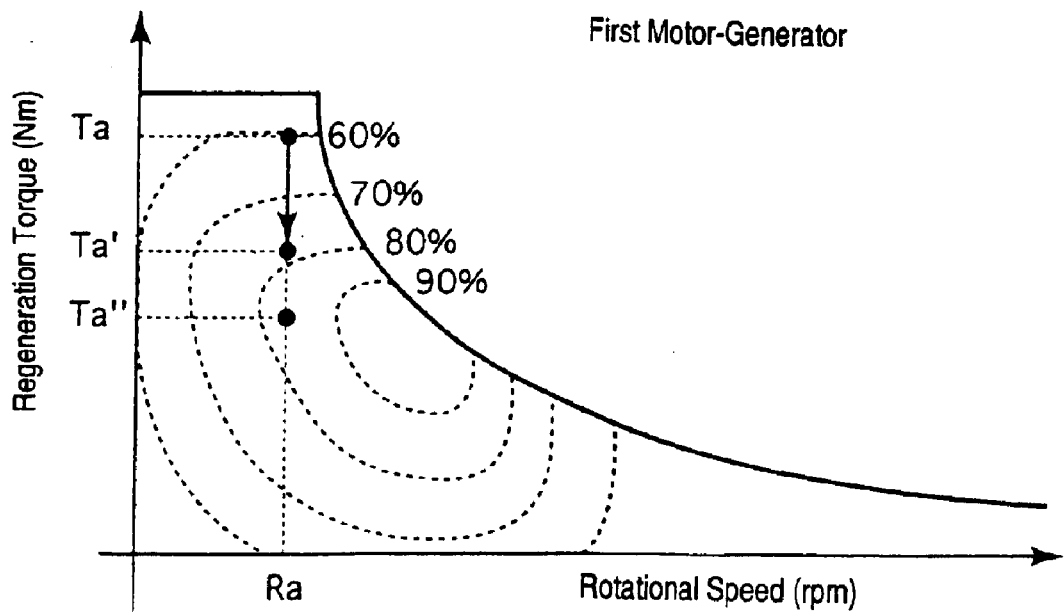
FIG. 6(a) is a graph showing rotational speed versus torque characteristics of the first motor-generator in accordance with the first embodiment of the present invention.
Figure 6B:
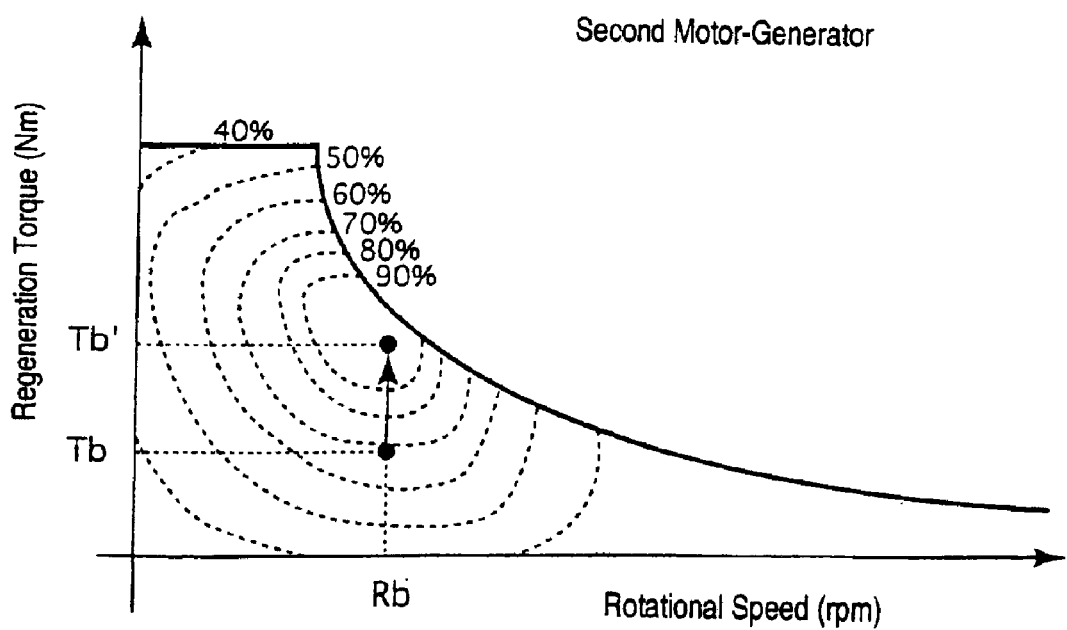
FIG. 6(b) is a graph showing rotational speed versus torque characteristics of the second motor-generator in accordance with the first embodiment of the present invention.
Figure 7:
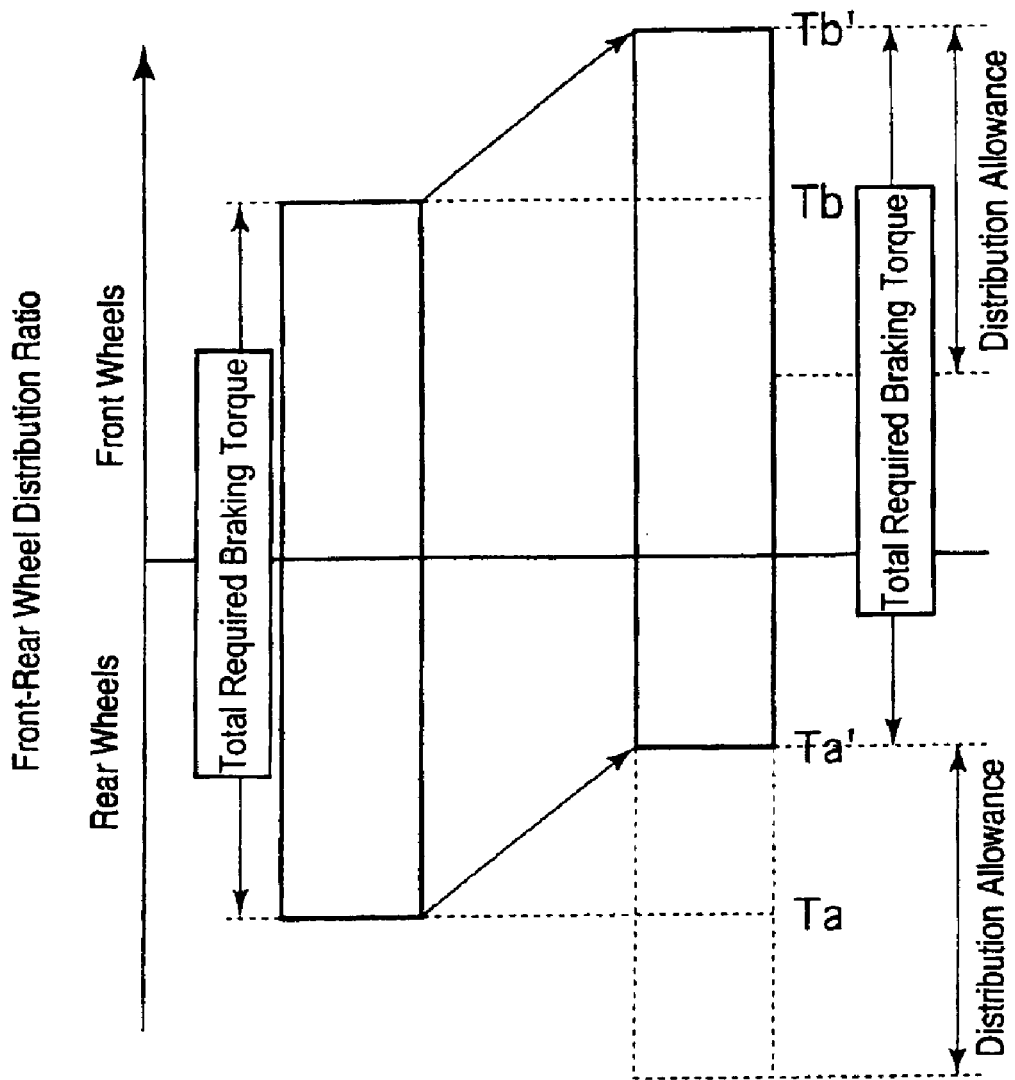
FIG. 7 is a diagrammatic view illustrating an example of correcting the front-rear wheel distribution ratio in accordance with the first embodiment of the present invention.
Figure 8:
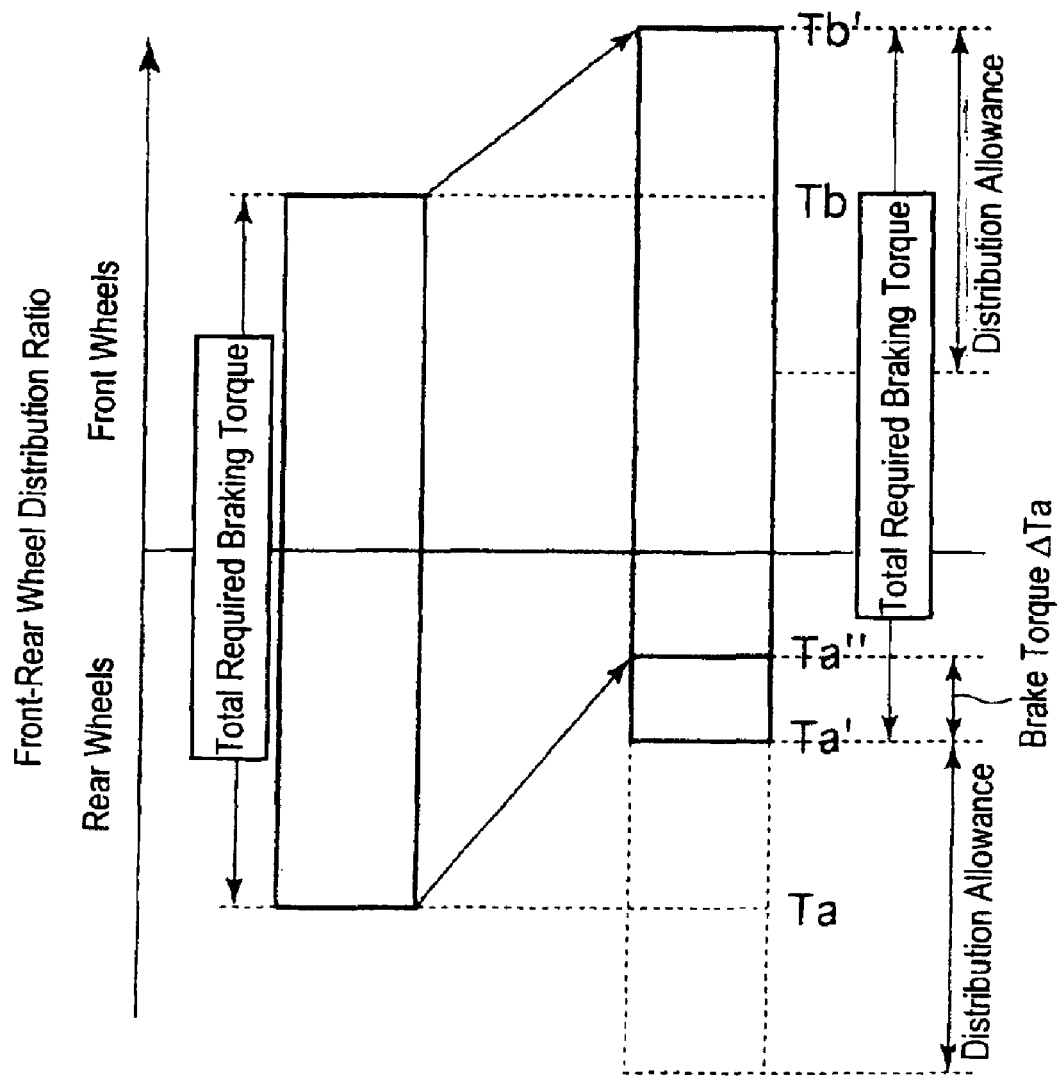
FIG. 8 is a diagrammatic view illustrating another example of correcting the front-rear wheel distribution ratio in accordance with the present invention.

An even more preferable system is one in which the pump efficiency required to secure the reservoir hydraulic pressure of the brake actuator 8 is taken into account. When the electric power generation efficiency will be increased by applying a brake torque with the hydraulic brake actuator 8, the control apparatus calculates the hydraulic command value of the brake torque independently of the depression force of the brake pedal 9a, sends the calculated hydraulic command value to the brake actuator 8 (see block a9 of FIG. 3), and corrects the regeneration torque command value in accordance with the hydraulic pressure command value. For example, as shown in FIGS. 6 and 8, when a prescribed brake torque ΔTa is applied to the rear wheels 31, the regeneration torque Ta' of the first motor-generator 2 can be reduced by the amount of the brake torque ΔTa to Ta". As a result, the electric power generation efficiency of the first motor-generator 2 can be increased.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-299831. The entire disclosure of Japanese Patent Application No. 2002-299831 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle control apparatus comprising:
   a first motor-generator operatively coupled to at least one first wheel;
   a second motor-generator operatively coupled to at least one second wheel that is not connected to the first motor-generator; and
   a regenerative braking component configured and arranged to perform regenerative braking in which a first braking torque is applied to the first wheel by regeneratively operating the first motor-generator while a second braking torque is applied to the second wheel by regeneratively operating the second motor-generator,
   the regenerative braking component configured and arranged to include
      an ideal front-rear wheel distribution ratio calculating section configured and arranged to calculate an ideal front-rear wheel distribution ratio between the first braking torque applied to the first wheel and the second braking torque applied to the second wheel;
      a distribution allowance calculating section configured and arranged to calculate a distribution allowance of the ideal front-rear wheel distribution ratio; and
      a distribution ratio correcting section configured and arranged to correct the ideal front-rear wheel distribution ratio within a range of the distribution allowance to increase electric power generation efficiency of at least one of the first and second motor-generators.

2. The vehicle control apparatus as recited in claim 1, further comprising:
   a vehicle speed detecting section configured and arranged to a vehicle speed, and
   a braking torque calculating section configured and arranged to calculate a required braking torque based on a deceleration request, and
   the distribution ratio correcting section being further configured to correct the ideal front-rear wheel distribution ratio based on the vehicle speed detected and the required braking torque calculated.

3. The vehicle control apparatus as recited in claim 2, wherein
   the regenerative braking component is further configured to include a drive mode detecting section to determine if selection of one of a two-wheel drive mode and a four-wheel drive mode; and
   the distribution allowance calculating section is further configured to calculate the distribution allowance differently depending on which of the two-wheel drive mode and the four-wheel drive mode has been determined to be selected.

4. The vehicle control apparatus as recited in claim 3, further comprising an engine configured and arranged to drives one of the first and second wheels.

5. The vehicle control apparatus as recited in claim 4, wherein the regenerative braking component includes a braking device configured to apply a brake torque to at least the first and second wheels such that the electric power generation efficiency of at least one of the first and second motor-generators is increased.

6. The vehicle control apparatus as recited in claim 1, wherein the regenerative braking component is further configured to include a drive mode detecting section to determine if selection of one of a two-wheel drive mode and a four-wheel drive mode; and the distribution allowance calculating section is further configured to calculate the distribution allowance differently depending on which of the two-wheel drive mode and the four-wheel drive mode has been determined to be selected.

7. The vehicle control apparatus as recited in claim 1, further comprising an engine configured and arranged to drives one of the first and second wheels.

8. The vehicle control apparatus as recited in claim 1, wherein the regenerative braking component includes a braking device configured to apply a brake torque to at least the first and second wheels such that the electric power generation efficiency of at least one of the first and second motor-generators is increased.

9. A vehicle control apparatus comprising:

first motor-generator means for driving at least one first wheel and for generating electricity from the first wheel;

second motor-generator means for driving at least one second wheel that is not connected to the first motor-generator means and for generating electricity from the second wheel; and regenerative braking means for performing regenerative braking in which a first braking torque is applied to the first wheel by regeneratively operating the first motor-generator means while a second braking torque is applied to the second wheel by regeneratively operating the second motor-generator means, the regenerative braking means being configured and arranged for calculating an ideal front-rear wheel distribution ratio between the first braking torque applied to the first wheel and the second braking torque applied to the second wheel;

calculating an allowance of the ideal front-rear wheel distribution ratio; and correcting the ideal front-rear wheel distribution ratio within a range of the distribution allowance to increase electric power generation efficiency of at least one of the first and second motor-generators.

10. A method of vehicle control apparatus comprising:

first motor-generator means for driving at least one first wheel and for generating electricity from the first wheel;

second motor-generator means for driving at least one second wheel that is not connected to the first motor-generator and for generating electricity from the second wheel; and performing regenerative braking in which a first braking torque is applied to at least one first wheel by regeneratively operating a first motor-generator while a second braking torque is applied to at least one second wheel that is not connected to the first motor-generator by regeneratively operating a second motor-generator, calculating an ideal front-rear wheel distribution ratio between the first braking torque applied to the first wheel and the second braking torque applied to the second wheel;

calculating an allowance of the ideal front-rear wheel distribution ratio; and correcting the ideal front-rear wheel distribution ratio within a range of the distribution allowance to increase electric power generation efficiency of at least one of the first and second motor-generators.

* * * * *